(12) United States Patent
Mobley

(10) Patent No.: US 10,798,920 B2
(45) Date of Patent: Oct. 13, 2020

(54) TRACKING AND MONITORING WITH GEO-FENCING

(71) Applicant: nMode Solutions, Inc., New Albany, IN (US)

(72) Inventor: Tim Mobley, Marana, AZ (US)

(73) Assignee: nMode Solutions, Inc., New Albany, IN (US)

( * ) Notice: Subject to any disclaimer, the term of this patent is extended or adjusted under 35 U.S.C. 154(b) by 0 days.

(21) Appl. No.: 16/216,706

(22) Filed: Dec. 11, 2018

(65) Prior Publication Data

US 2019/0110441 A1   Apr. 18, 2019

Related U.S. Application Data

(63) Continuation of application No. 15/076,584, filed on Mar. 21, 2016, now Pat. No. 10,292,370, which is a continuation of application No. 13/917,328, filed on Jun. 13, 2013, now abandoned.

(60) Provisional application No. 61/659,285, filed on Jun. 13, 2012.

(51) Int. Cl.
*A01K 29/00* (2006.01)
*A01K 11/00* (2006.01)

(52) U.S. Cl.
CPC .......... *A01K 29/005* (2013.01); *A01K 11/004* (2013.01); *A01K 11/008* (2013.01)

(58) Field of Classification Search
CPC .................................................. A01K 11/008
USPC ........................................................ 40/300
See application file for complete search history.

(56) References Cited

U.S. PATENT DOCUMENTS

| | | | |
|---|---|---|---|
| 6,639,516 B1 * | 10/2003 | Copley | G08B 21/0283 340/426.17 |
| 7,061,385 B2 * | 6/2006 | Fong | G08B 21/0236 340/539.21 |
| 7,382,248 B2 | 6/2008 | Black et al. | |
| 10,292,370 B2 | 5/2019 | Mobley | |
| 2004/0174264 A1 * | 9/2004 | Reisman | G07C 9/28 340/573.4 |
| 2005/0090201 A1 * | 4/2005 | Lengies | H04B 7/18506 455/41.2 |
| 2007/0044732 A1 * | 3/2007 | Araki | A01K 11/008 119/721 |
| 2009/0040041 A1 | 2/2009 | Janetis et al. | |
| 2009/0066568 A1 | 3/2009 | Britz et al. | |
| 2009/0238087 A1 * | 9/2009 | Shikowitz | G01D 21/00 370/252 |

(Continued)

OTHER PUBLICATIONS

U.S. Appl. No. 13/917,328 Office Action dated Apr. 17, 2015.
(Continued)

*Primary Examiner* — Joanne Silbermann
(74) *Attorney, Agent, or Firm* — Polsinelli LLP

(57) ABSTRACT

A networked cattle tracking system may track cattle using a base station, smart tags for cattle, and a mobile device. Tags are placed on each animal within a group of cattle. The tags may communicate with each other and with a base station. The tags may communication animal location and other information, including temperature, movement, blood information, and so on. A user may track cattle location, behavior, health, and other information at a base station monitor or a remote wireless device in communication with the base station and plurality of tags.

19 Claims, 6 Drawing Sheets

(56) References Cited

U.S. PATENT DOCUMENTS

| | | | |
|---|---|---|---|
| 2010/0127919 A1* | 5/2010 | Curran | G01S 19/40 340/573.4 |
| 2010/0321182 A1 | 12/2010 | Wangrud | |
| 2011/0006912 A1 | 1/2011 | Sheardown et al. | |
| 2013/0340305 A1 | 12/2013 | Mobley | |
| 2016/0198680 A1 | 7/2016 | Mobley | |

OTHER PUBLICATIONS

U.S. Appl. No. 13/917,328 Final Office Action dated Sep. 5, 2014.
U.S. Appl. No. 13/917,328 Office Action dated Feb. 18, 2014.
U.S. Appl. No. 15/076,584 Office Action dated Sep. 21, 2018.
U.S. Appl. No. 15/076,584 Final Office Action dated Aug. 10, 2017.
U.S. Appl. No. 15/076,584 Office Action dated Oct. 14, 2016.

* cited by examiner

| type | Qty | Cow pasture | | bull pasture | replacement pasture | summer pasture | winter pasture | breeding | Test Area | Feedlot | | | Sold | Slaughter |
|---|---|---|---|---|---|---|---|---|---|---|---|---|---|---|
| | | summer | winter | | | | | | | Feed Pens | Sick Pens | | | |
| Bull | 5% | | | X | | | | | | | | | | |
| Steer | 35% | | | | | X | X | | | X | | | X | X |
| Replacement Heifer | 20% | X | X | | | | | | | | | | X | |
| Slaughter heifer | 30% | | | | | X | X | | | X | X | | X | X |

FIGURE 3

TRACKING AND MONITORING WITH GEO-FENCING

CROSS-REFERENCE TO RELATED APPLICATIONS

The present application claims the priority benefit of U.S. patent application Ser. No. 15/076,584 filed Mar. 21, 2016, which is a continuation of U.S. patent application Ser. No. 13/917,328 filed Jun. 13, 2013, which claims the priority benefit of U.S. provisional application No. 61/659,285 filed Jun. 13, 2012. The disclosures of which are incorporated herein by reference.

BACKGROUND OF THE INVENTION

Cattle loss through theft and fraudulent invoicing, fictitious death loss, under reported livestock on BLM managed lands, and low compliance with federal laws for tracking imported livestock cause multimillion dollar losses to cattle ranchers, bankers, and taxpayers. Several issues face the livestock industry in the United States.

First, cattle theft and fraud is at an all-time high, costing insurer millions of dollars per incident, and there are many high-value incidents reported each year. Most theft cases go unsolved, and there is no traceability across state lines, so stolen cattle in one state can be transported across state boundaries and be sold at full price using a stolen tag.

Second, stock have a high cost to management in many aspects of production, such as feeding, immunization tracing, disease quarantine, herding for counting and identification, and many other area. Additionally, source location is unknown for diseased or contaminated animal food products, which causes widespread recall of food products. Food recall has a high cost association and high social impact to end consumers. In addition to these issues, there is a market demand whereby consumers want to know the source of their food purchased at food markets.

There is a need in the art for an improved system of tracking cattle.

SUMMARY OF THE CLAIMED INVENTION

The present technology may track cattle using a networked tracking system. Tags are placed on each animal within a group of cattle. The tags may communicate with each other and with a base station. The tags may communication animal location and other information, including temperature, movement, blood information, and so on. A user may track cattle location, behavior, health, and other information at a base station monitor or a remote wireless device in communication with the base station and plurality of tags.

BRIEF DESCRIPTION OF THE DRAWINGS

FIG. 3 is an exemplary table of information for tracked animals.

DETAILED DESCRIPTION

Figure 1:
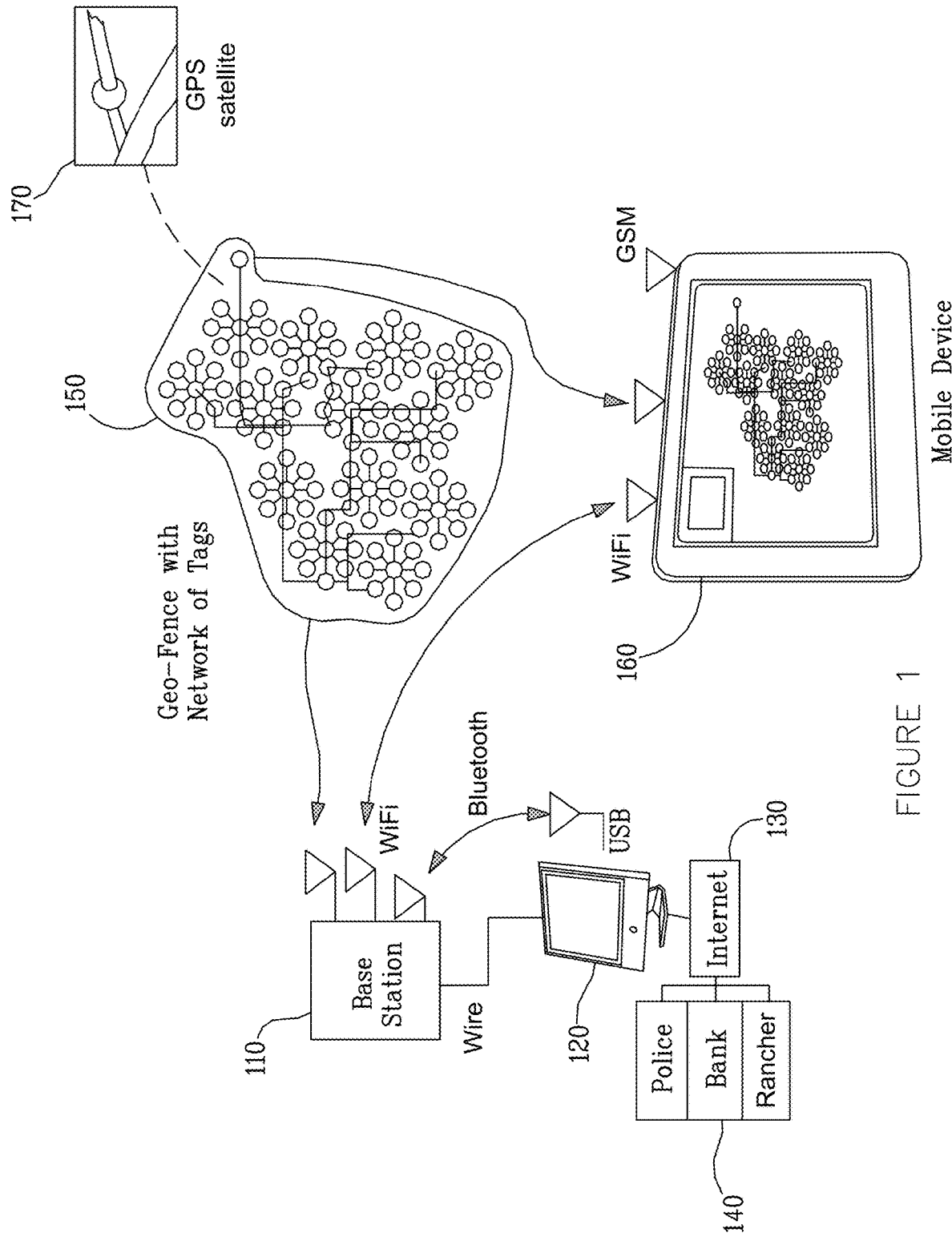
FIG. 1 is a block diagram of an exemplary system for tracking cattle.

This invention provides a system for tracking of livestock and prevention of livestock theft and fraud. The tracking system of the present invention may help prevent livestock management and production inefficiencies, guessing or estimation of visual evaluation to ascertain the genetic endpoint or market readiness of the animal, and prevents unnecessary death loss. Embodiments of the invention may be used to improve conception rate of livestock, relocation of bulls for more efficient cow conception rates, prevent wasting of feed to livestock, improve impact to the environment, stewardship of the environment, identifying the source and location of disease infected animals for minimal quarantine implementation, elimination of bullers syndrome, and early indication of health and digestive problems.

In September of 2010, the FCC released the white space of analog TV channels when digital television was mandated. The present technology may include RF (radio frequency) and wireless products for communication systems with very low power consumption, which can receive small signals at very long distances. The present technology may include a TVWS wireless communication system or datalink that may operate at a local cattle feeding operation or ranch, which is termed the base or headquarters. A tag or sensor (used interchangeably herein) cost target is inexpensive, and that have a base station with an antenna at the headquarters is a suitable technical approach. By doing this, the need for cellular capabilities in each ear tag is eliminated, thereby decreasing the cost significantly.

In embodiments, a WiFi radio and modules for television white space may be used to implement portions of the present technology. The present technology may operation over a frequency of 466-866 MHz, and may use the frequency associated with "Super White Frequency" based on an FCC Ruling from Sep. 23, 2010. The invention may include a smart grid radio that operates in the same white space or other bands.

There are several advantages to the present invention, which include; instant geo-location of each tag overlaid onto a map on a computer, flexible frequency plan to get optimal operation due to terrain differences, low cost, and a system that is ideal for open ranges and feeding operations.

The system of the invention may include a high signal to noise ratio radio capable of detecting ultra low signals at the local base station for Tx/Rx (>30 dBm Output), with high gain antenna (>20 dB) that can communicate using spread spectrum, among other modulation techniques. 2. Multiband all whether radio capable of detecting ultra low signals at the local base station at super Wi-Fi white space frequencies, a receiver/Transmitter hardware, an antenna, mobile handheld device, a software for installation on laptop, users computer, or other computers connected the internet, a RF short range datalink to other computers and/or the handheld device, a connection to the internet work can provide the data to remote locations on the web.

The present technology may include a remote sensor small enough to fit onto the ear tag of a livestock that includes an RF section that allows communication to the base station, a GPS section that provides the coordinates, a processing section that provides power conditioning, modulation of the digital coordinates for the RF section, a power source such as a battery, and/or a charging circuit from a solar film source.

Cell phone capability could be added to track the sensors over a longer range. The short range wireless function can be optional. Bluetooth, Wi-Fi, Zigbee and other standard wireless capability could be added for use as a control, indicator, or other means. The remote sensors are a datalink to the base station that indicates location within the geo-fence relaying its coordinates from the GPS section.

The base station has a datalink to each remote tag within the geo-fence overlays each position onto a map, and performs a comparison against the known id's of remote tags. Should one or more sensors be determined outside of the geo-fence, that would be considered a breach, and alarm will indicate the breach to the user. The remote sensor is able to receive GPS coordinates and send those coordinates, along with battery life, to a local base station via super WiFi white space band. The local base station will then communicate to a local computer that will overlay the location of the remote sensor on to a map that will have a predetermined geo-fence. The system may be configured to alert police, bank, rancher, and other entities via internet communication.

The remote sensors may remain in sleep mode for power management until the base station datalink provides to correct code to wake up the remote sensor. Once the remote sensor wakes up, it will transmit its coordinates and from the GPS section (and any other data collected by other sensors) back to the base station. The base station will compare the coordinates against the geo-fence. If the remote sensor is within the geo-fence, then the base station will record it on the map for visual display. The base station will do this for each remote tag defined by the user An embodiment of implementing the system is as follows. A local base station may be designed and fabricated as is known in the art. Livestock remote sensors may also be designed and fabricated. Software for the processing of the data and mapping software may be created and the software may be programmed with the unique identifiers to be used with the geo-fence. A geo-fence may be created for the area of interest. A user or administrator may then install the sensors on livestock and perform an inventory of sensor ID's. The sensor can modified to be used on livestock and other animals such as sheep, horses, swine, poultry, zoo animals, hunting dogs, wildlife tracking parks or other areas. The user can view the updated map with all sensor locations on a PC or handheld mobile device using the software and networked base station and sensors. The user can take action to breach of a remote sensor to alert authorities, track down stolen livestock, and recover stolen livestock. Additionally, the computer and sensors can be networked, for example via the internet, and remote users can load the software and program the sensors into the software, which allows other users to remotely monitor the livestock sensors.

The present technology can be used to track advanced data and knowledge of animals throughout the life of the animal, such as, but not limited to; white blood cell count, lipids, blood titer, immunization records, body temperature, rumin ph, association of calf to cow, association of bull to cow, amino acid levels and hormone levels of the blood, and any other blood characteristics or any other parameter that can be measured. Rain fall levels compared to historical average, measurement of forage production, and ambient heat compared to historical average heat. A life cycle of the animal's geographical history from birth to death can be maintained and tracked, where there are many life cycles within the total period of life for the animal. A system may provide any stored information of the animal to end users for the purposes of knowing the location of where the food came from using the aforementioned knowledge recorded of the animal, post processing information can be understood, such as but not limited to, to determine body fat, pregnancy, genealogy tree, genetics, feed consumption which all can be used for improvement of management and production efficiencies. Using the correlation of blood lipid levels to body fat, the present system can determine the animal's genetic end point or market readiness. Users can access to temperature and rainfall data and relocate the livestock to optimal feeding area as needed.

The sensors can be reconfigured to any electronic device, to remotely send any data to a base station, for example home audio/video applications to stream data from a central base station to any device in the household or within the range of the base station. Monitors and/or TVs could receive their data from the base station in lieu of connecting to a cable, phone, or satellite outlet, thereby eliminating the need for routing cable, phone, data, and internet cable throughout a house or building. Streaming data from video and audio recording devices to remote TV's or monitors may thereby eliminate the need for routing cables (Examples would be at concerts, events, temporary stations for informing, etc.). A local long range radio frequency datalink may be established between a single and/or multiple remote sensors within a defined range or distance. Additionally, the remote sensors have a GPS tracking capability, whereby the livestock's location coordinates are provided to the RF portion and then communicate through the RF datalink to the base station. The base station may include mapping software with a user defined geo-fence that will overlay coordinates of each sensor. The software at the base station will determine if the coordinates of each sensor are within the geo-fence. If not, an alarm will indicate to the user that a fence breach has been detected. The base station mobile device will provide the user with a map and the location of the sensor that has breached the geo-fence, allowing the user to locate the livestock that has breached the fence.

The tags can be uniquely coded so that specific information to the subject animal can be loaded and used throughout the history of the tag. Information about specific tags linked to specific animals can be recorded within the software at the base station. The data within the software is available to the user for post processing.

The tracking system can use an unlimited amount of remote sensors that uses the super-Wi-Fi white space frequency band, having a very low power consumption circuit to put the remote tag into a sleep mode, whereby can wake up upon receiving a signal from the a long range base station datalink, which will then transmit the GPS coordinates and other sensor data back to the base station, which then uses a short range datalink to transmit the data to RF datalink via a USB connection to a computer, which is then connected to the internet and display the GPS coordinates and other sensor data onto a map or in a database.

FIG. 1 is a block diagram of an exemplary system for tracking cattle. The system of FIG. 1 includes a base station 110, a computing device 120, one or more networks 130 such as the Wi-Fi, the Internet, GPS network, and other communication networks, third party entities 140 such as police, banks and ranchers, a geo fence 150 with a network of tags, a mobile device 160 and GPS satellites 170. Within the network of tags are a plurality of RF tags or sensors with GPS capability and a television white space (TVWS) datalink. The local base station, which may be fixed or mobile, may transmit and receive data and utilize high power TVWS frequencies. The computer may include a processor and memory, the memory storing mapping software configured to communicate with the wireless link to the base station when executed by the processor.

The system of FIG. 1 may include an antenna connected to the base station for transmitting and receiving communications to the tags within and outside of the geofence. A connection may be formed between via TVWS between the computing device 120 and the base station to record data from the tags through the base station. The computing device 120 may include one or more applications which are able to process received tag data and provide tag location on map with an indication of the geofence. The applications may also allow a user to record information defined in the tags and associated with a unique identifier associated with each tag. A user of computer device 120 can monitor the location of the tags and corresponding animals and determine if they remain within the geofence or not. If an animal with a tag moves outside the geofence, an alarm may be triggered to inform a user or other entity of the tag outside the geofence.

There are several advantages to using wireless communication via TVWS frequencies as in embodiments of the present invention. First, the TVWS utilizes frequencies in the 50-700 MHz bands, which prior to now have not been available due to FCC restrictions. These lower frequencies correspond to long wavelengths allowing for low power signals to travel further than cell phones. Wavelength A is proportionate to frequency, as illustrated below:

$$\lambda = v/f$$

where .v is the magnitude of the phase velocity and f is the frequency.

The lower the frequency the longer the wavelength, which also implies less instantaneous bandwidth the system can provide. TVWS frequencies enable this optimum point to be reached between frequency, power and bandwidth. Secondly, power and data are crucial to the success of a cattle tag system. Wireless communication allows transmission of signals at the lowest possible power with high data efficiency. In the case of the cattle tag, Spread Spectrum communication allows for the tag to transmit and receive from long ranges (up to 160 miles), which is far superior to what has been achieved with Bluetooth or RFID technology. Operational long ranges correspond to tag energy conservation for a long lasting tag life (>7 years), with a solar power charging circuit.

The third advantage is that the system will be made up of 'Smart' tags, as shown as blue dots in FIG. 1, which are networked together, so that all individual tags do not have to communicate back to the base station, thereby conserving power. The individual tags still maintain the capability to communicate individually to the base station, if they cannot network together.

An alarm may be triggered if a sensor attached to an animal is detected outside of the geofence. The alarm can be user defined, and may result in generation and transmission of a message in the form of an email, phone call, page, SMS message, or other message. The message may include information including the location of the sensor, the animal associated with the sensor, time and date information (time stamp), and other information. A base station, which may be a mobile device or other computing device, may be used to locate the sensor and collect location information from the sensor. For example, the base station may be moved to communicate with the sensor and collect location information from a GPS receive unit, such that the sensor location can be displayed by the computing device on a map or other display. When implemented as a mobile device, the base station may include one or more applications for communicating with sensors, displaying location and other data about each sensor, such as for example within a map displayed in the device, and other functionality as described herein for a base station.

Figure 2:
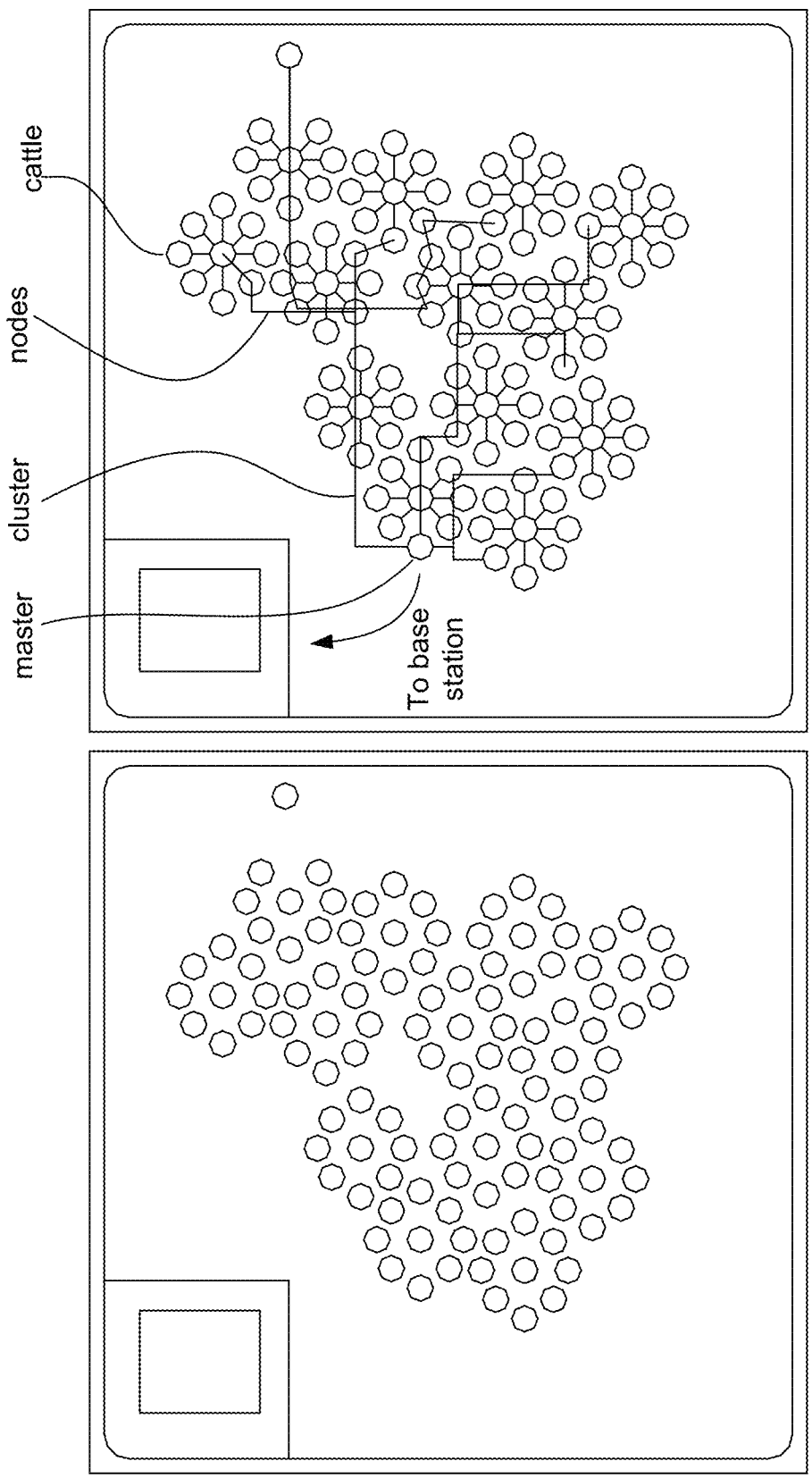
FIG. 2 illustrates exemplary nodes of tags.

FIG. 2 illustrates exemplary nodes of tags. In some embodiments, each tag will belong to a node, shown as an orange dot. A node will be made up of small number of tags that can be customized. Each node identifies a node leader closest to the base station and the node leaders are grouped. This grouping will be called a cluster, shown as purple dots. Each cluster can be a customizable number of node leaders. The reconfiguration happens autonomously a few times a day. By doing this, tags will communicate with each other and configure themselves so that only a few tags communicate to the base station. In the event that one tag strays away; the GPS signal will be relayed to its node leader; the node leader will communicate to the cluster and the cluster leader that is closest to the base station, shown as a black dot, will relay the information of the cattle that is stray, shown as a red dot on FIG. 2. Cell phones, WiFi technology and Bluetooth applications may be used to make the cost of the tag system more achievable by leveraging from their components used in the applications. The recently open TVWS frequencies for wireless communication has allowed for low power tags, efficient tracking, flexible frequency plans, and expandable sensor technology.

The cattle tag may be a smart device which logic enabling it to communicate with other tags and make decisions based on the sensor location, needs and battery power. However, being smart is only one of many challenges that the tag may overcome. Most consumer electronic products have poor reliability. Few or no cell phones or Bluetooth devices can withstand the hardship of rain, snow, sun, and heat. The present technology may leverage existing consumer electronics technologies on sensors, packaging, solar cell, Radios, GPS, and antennas to come up with an innovative tag system.

The natural environments around a cattle tag may be rugged and difficult. In many occasions, the electronics circuits withstand prolonged exposure to water and dust. In electronics, water exposure or humidity causes corrosion, which causes circuits of the prior art to fail over time. Also, when humidity gets trapped inside electronics circuits, it leads to short circuits causing permanent damage. On the other hand, low humidity allows for static electricity, which a single discharge can lead to latent failures of the sensors over time. Heat is another factor that can cause the tag to get damaged when the thermal junction of electronic devices reaches its maximum temperature rating. The tag of the present technology will successfully withstand the surrounding environments.

Different types of sensors may be used to collect information. One system may need to capture temperature, while another sensor may warn about battery life. Other sensors may collect bio-information by communicating to RFID or Bluetooth devices within the body of the cattle. An anti-tampering sensor may warn a user, administrator or both if the cattle travel too fast or if the tag has been removed from the cattle. These sensors along with others make the tag a vital element on how cattle is produced and monitored for decades to come.

Radio, GPS, & antenna technology are a critical to the tag. The advent of highly integrated circuits into Monolithic Microwave Integrated Circuits (MMICs) allow Radio Frequency (RF) circuits to be more highly integrated, allowing for smaller and lower cost circuits. The insurgence of GPS circuits in MMIC technology, primarily used by companies like Garmin, has led to more cost effective options. The antenna technology has also evolved and can now be embedded into a MMIC or the package. Moving forward, all of these elements make the tag small and cost effective.

Additional elements that make the tag unique are the solar energy & packaging technology. The tag uses solar energy to ensure that the tag stays charged with state of the art battery technology. The solar cells will be integrated as part of the packaging technology. The advancement of new materials enables Polylithic packaging constructions.

The local base station will be modular in nature. To make the base station as cost effective as possible, the station may be configurable to adopt multiple data links, frequencies, transmit power levels, power sources, and installations. The local base station may reconfigure it's transmit and receive data links to work under most TVWS frequency and bandwidths. At the same time, it will have a power amplifier module that can be replaced depending on the need for high, medium, or low power transmission. Additionally, the multi-data link channels will have GPS & Bluetooth capability. One data link is used as an option to communicate with an external mobile device that may be searching for the cattle, in a search and find mode. The station will come with a computer or a laptop with a USB thumb drive using Bluetooth technology. The Bluetooth provides a wireless link from the base station to a local computer, which provides instant reports to end user via the Internet about cattle location, sensor, and battery life.

The mobile device may provides tag tracking capability; in a search and find mode of an application stored in memory of a mobile device and executed by one or more mobile device processors (not illustrated in FIG. 1), a map with location of cattle information streaming live from the local base station or from the tags; whichever is closer, such as utilizing an executable application present on the mobile device. The mobile device may also have cellular phone capability which can send information via the cell phone towers any where in the world about cattle location.

A few benefits of the present tracking system is that users may have an instant location of any animal wearing a smart tag, overlaid onto a map on their computer or handheld device. If a theft occurs, the user is alerted immediately and can alert authorities and/or track the stolen tags themselves. Another advantage is that the sensors that are deployed today can be interfaced with a data link, and can be individually traced with the animal's assigned identification. Mother-daughter relationships of tags can be created, so calf's can be associated with the cow and can be maintained in the database for the life of the animal along with any other sensor data that can be interfaced with our datalink. Vital information of the animal can be stored and reviewed simply by calling up the identification information on the user software.

The present technology may also be used for other market applications such as consumer electronics and connectivity applications, and other applications as the TVWS white space guidelines permit.

The present livestock tracking system of the present invention will allow for instant location of cattle on mapping software and interface with existing sensors such as Zigbeef, bolus's, temperature sensors, and other measuring sensors that exist today. This will reduce theft of cattle saving the cattlemen and insurers many millions of dollars per year and reduce operations cost associated with handling of the livestock to read the identification of the animal.

The present livestock tracking and identification system will satisfy the USDA Strategic Goal 3 (Help America Promote Agricultural Production And Biotechnology Exports As America Works To Increase Food Security) by allowing feedlots and ranchers of livestock to revolutionize the methods in which they manage and protect livestock by having instantaneous location and information about a specific animal. They will be able to utilize the data for creating optimal food products and changing habits that greatly benefit animal food consumers in the USA.

FIG. 3 is an exemplary table of information for tracked animals. The table of FIG. 3 includes column headings of animal type, animal quantity, area descriptions such as summer cow pasture, winter cow pasture, bull pasture, replacement pasture, summer pasture, winter pasture, breeding, feed lot test area, feed lot feed pens, and feed lot sick pens, and animal status such as sold and slaughter. The rows include headings for types of animas, such as bull, steer, replacement heifer and slaughter heifer. The quantity column may display information in percentage format, numbers of animals or other format.

Each area in the table may be associated with one or more geofenced areas. For each area description, the number of animals in the area may be indicated in the chart. The table may also reflect that animals are kept or should be kept in the particular area. The information in the table may be entered by a user to configure a geofencing area and alerts. Alternatively, the information in the table may be all or partially populated based on data retrieved from the tags and known geofencing boundaries.

Figure 4:
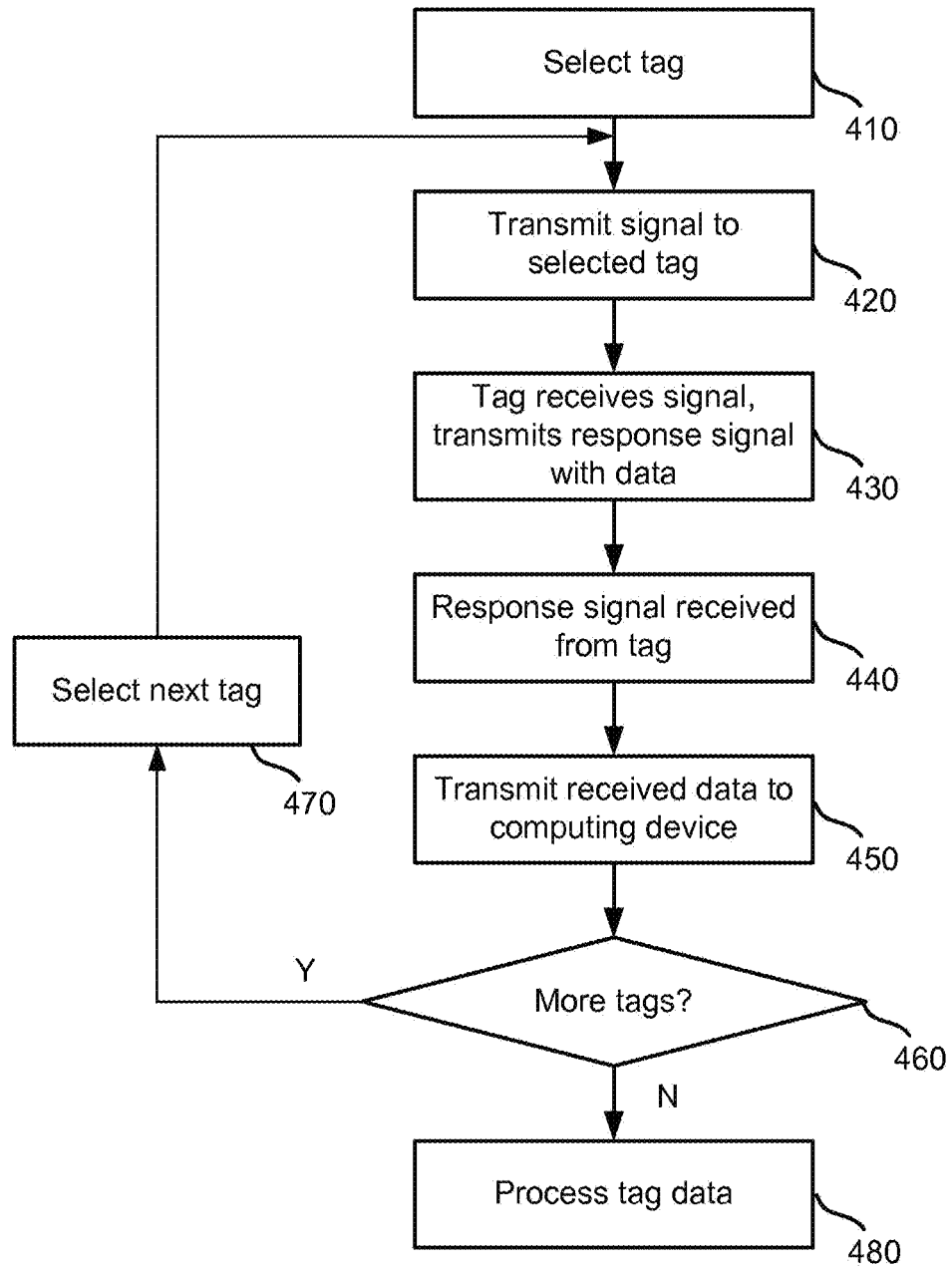
FIG. 4 is an exemplary method for retrieving data from a tag.

FIG. 4 is an exemplary method for retrieving data from a tag. First a tag is selected at step 410. A signal is transmitted to the tag at step 420. A base station may transmit a TVWS pulse to the selected tag to activate the tag and retrieve information from the tag. The tag receives the signal at step 430 and transmits a response signal with data. The tag may be in sleep mode upon receiving the pulse. The tag may "awake" from sleep mode, transmit its current coordinates and other data to the base station, and may then return to sleep mode. The current coordinates for the tag may be determined from a GPS system which includes GPS satellites.

The response from the tag is received at step 440 and the data in the response is provided to a computing device, such as computing device 120 of FIG. 1, at step 450. A determination is made as to whether more tags are to be "pinged" for location and other data at step 460. In some embodiments, each tag may be pinged periodically, so more tags may exist to be pinged if a corresponding tag has not been pinged along with the other pinged tags during the current period. If more tags exist to be pinged, the next tag is selected at step 470 (for example, by computing device 120) and the method returns to step 420. If not further tags exist to be pinged, the tag data is processed at step 480. Processing tag data is discussed in more detail with respect to FIG. 5.

Figure 5:
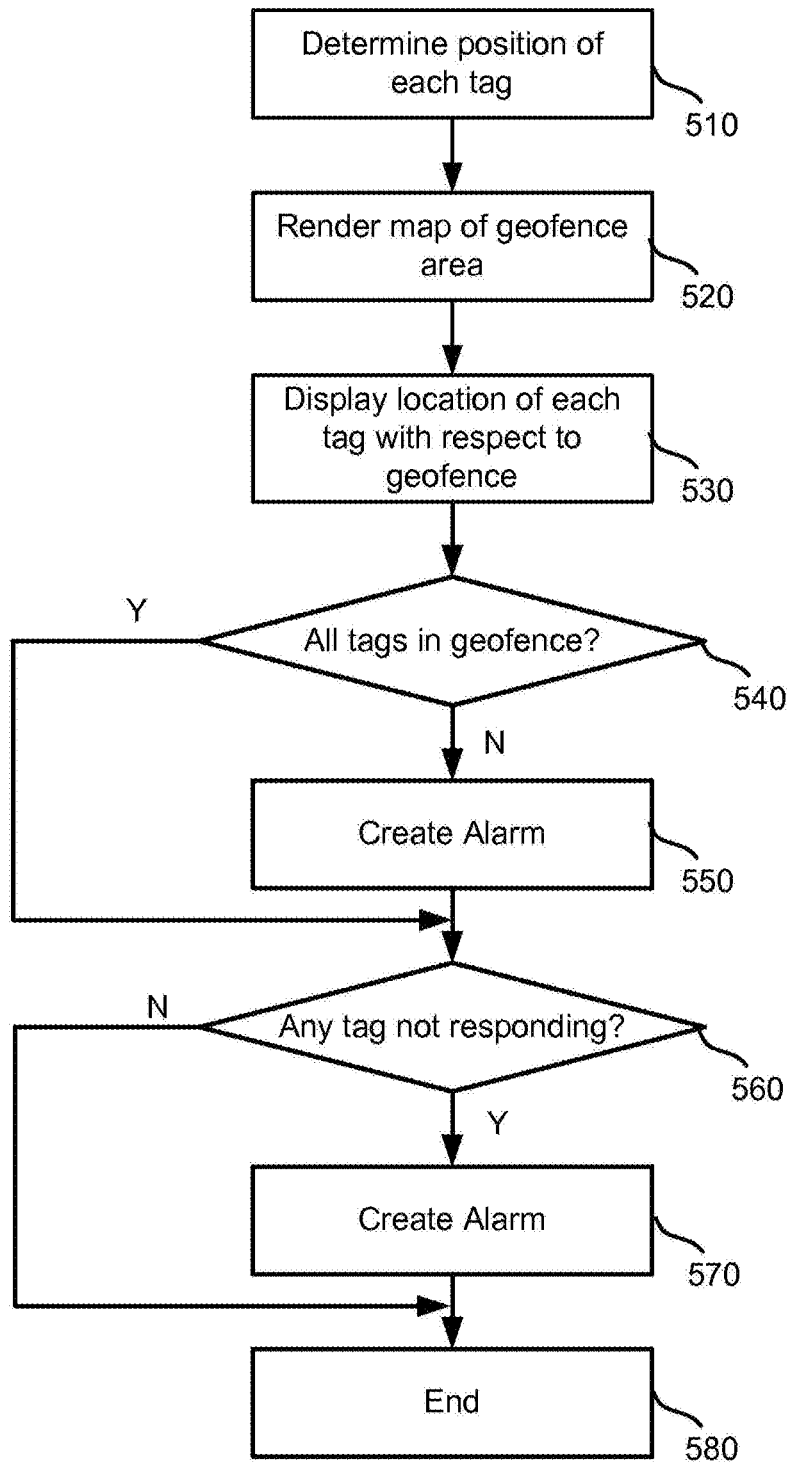
FIG. 5 is an exemplary method for processing tag data.

FIG. 5 is an exemplary method for processing tag data. A position of each tag is determined from the received tag data at step 510. A tag position may be determined from GPS data provided by the particular tag. A map of one or more geofenced areas is rendered at step 520. The rendering may include generating an image of the geofenced area and providing the image through a display of a device such as computing device 120 or mobile device 160. The location of each tag is displayed with respect to the geofence at step 530. Each tag may be located within the geofence, outside the geofence, or in some way to indicate that the tag location is not known.

A determination is made as to whether every tag is within the geofence and if any tag is determined to be outside the geofence at step 540. If any tag is determined to be outside the geofence, the system may create an alarm at step 550. Creating an alarm may include sending a message via email, SMS, or some other communication format to a user, administrator, or other recipient. The message may include tag ID, animal information, known animal location, time and date the tag was determined to be outside the geofence, and other information. If no tags are outside the geofence, the method of FIG. 5 continues to step 560.

A determination is made as to whether any tag location is not known or not responding to a signal transmission (step 420, FIG. 4) at step 560. If no tags are not responding or have an unknown location, the method of FIG. 5 ends at step 580. If any tag is not responding or has an unknown location, the system may create an alarm at step 570. The alarm at step 570 may be similar to the alarms of step 550, and may include tag ID, animal information, last known tag/animal location, time and of signal transmissions to the tag, and other data. If no tags are not responding or have an unknown location, the method of FIG. 5 ends at step 580. The method of FIG. 5 then ends at step 580.

Figure 6:
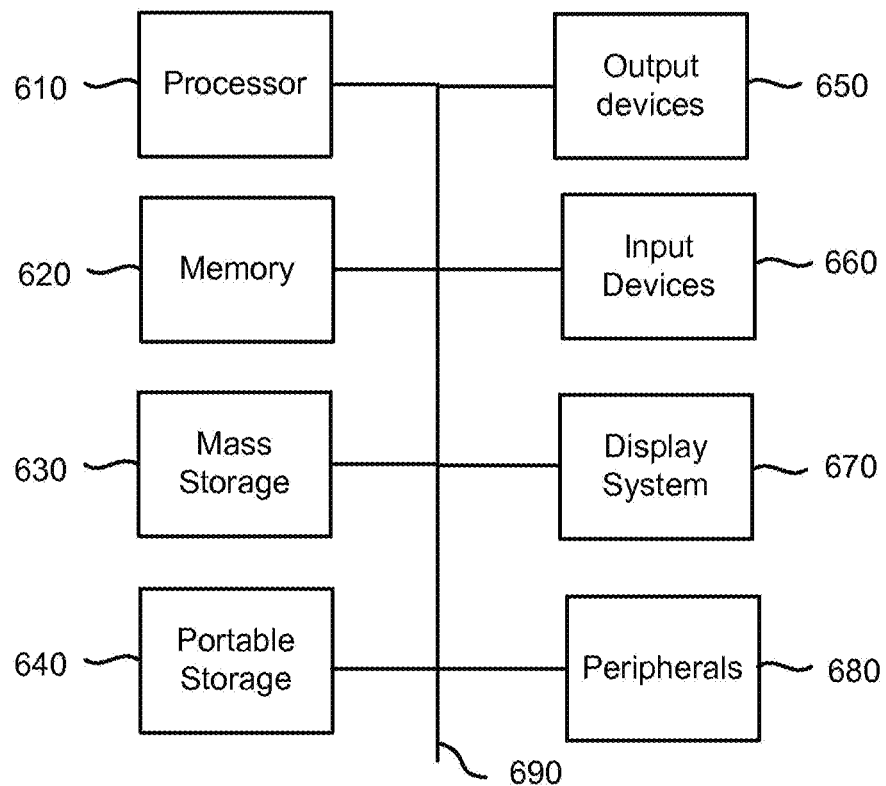
FIG. 6 illustrates an exemplary computing system that may be used to implement an embodiment of the present invention.

FIG. 6 illustrates an exemplary computing system 600 that may be used to implement an embodiment of the present invention. System 600 of FIG. 6 may be implemented in the contexts of the likes of portions of a base station, computing devices, hand held devices, monitoring systems, and other devices utilized in embodiments of the present invention. The computing system 600 of FIG. 6 includes one or more processors 610 and memory 610. Main memory 610 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 610 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A system for tag-based tracking, the system comprising:
   a plurality of tags that form a node that identify a selected tag in the node based on a distance between each of the plurality of tags in the node and a base station, wherein the selected tag is nearest to the base station among the plurality of tags in the node and changes autonomously according to movement of the plurality of tags versus the base station, wherein each of the plurality of tags in the node is attached to one object in a group of objects, receives satellite positioning signals, and communicates position information to the selected tag in the node; and
   the base station in communication with the selected tag over a wireless network, wherein the base station:
      receives data from the selected tag,
      determines a location and an identification for each of the plurality of tags in the
   node from the received data,
      determines that the group of objects is within a geofenced area based on the location and the identification for each of the plurality of tags in the node, and
      transmits the location and the identification for each of the plurality of tags in the node to a mobile device for display.

2. The system of claim 1, wherein the base station triggers an alert when an object from the group of objects is outside the geofenced area.

3. The system of claim 1, wherein the base station transmits map data of the geofenced area to the mobile device for display.

4. The system of claim 1, wherein the base station triggers an alert when a tag does not respond to the base station.

5. The system of claim 1, wherein the geofenced area is associated with the node.

6. The system of claim 1, wherein the base station provides graphical data to the mobile device for rendering the geofenced area, and the location and the identification for each of the plurality of tags in the node.

7. The system of claim 1, wherein the plurality of tags is configured to identify the selected tag in the node based on a change in the distance between each of the plurality of tags in the node and the base station.

8. The system of claim 1, wherein the plurality of tags is configured to identify the selected tag in the node based on expiration of a time period.

9. The system of claim 1, wherein each of the plurality of tags include a remote sensor, a power source, and a charging circuit.

10. The system of claim 9, wherein the remote sensor of the plurality of tags include a radio frequency section, a GPS section, and a processing section.

11. The system of claim 9, wherein the remote sensor of the plurality of tags captures a temperature of the object.

12. The system of claim 9, where in the power source of the plurality of tags include a battery, wherein the remote sensor of the plurality of tags transmits a signal to the base station regarding when the battery is low.

13. The system of claim 9, wherein the remote sensor of a tag remains in sleep mode until the tag receives a code from the base station to transmit GPS coordinates to the base station.

14. The system of claim 1, wherein the base station includes a memory that stores a history of location of each of the plurality of tags.

15. The system of claim 14, wherein the base station generates a graphical data based on the history of location of each of the plurality of tags.

16. The system of claim 1, wherein each of the plurality of tags communicate via television white space frequencies.

17. The system of claim 1, wherein the selected tag communicate with the base station via television white space frequencies.

18. A system for tag-based tracking, the system comprising:
   a plurality of tags that form a node, wherein each tag in the node is attached to an animal from a group of animals, receives satellite positioning signals, identifies a selected tag in the node based on a distance between each of the plurality of tags in the node and a base station, wherein the selected tag is nearest to the base station among the plurality of tags in the node and changes autonomously according to movement of the plurality of tags versus the base station, and communicates position information to the selected tag in the node; and
   the base station in communication with the selected tag over a wireless network, wherein the base station:
   receives data from the selected tag,
   determines a location and an identification for each tag in the node from the received data,
   determines the group of animals is within a geofenced area based on the location and the identification for each of the plurality of tags in the node, and
   transmits the location and the identification for each of the plurality of tags in the node to a remote device.

19. A method for tag-based tracking, the method comprising:
   determining a position of a node comprising a plurality of tags via satellite positioning signals, wherein each of the plurality of tags is attached to an object in a group of objects;
   communicating location for a selected tag within the node to a mobile device, wherein the selected tag is nearest to a base station among the plurality of tags in the node and changes autonomously according to movement of the plurality of tags versus the base station;
   determining that the group of objects are within a predetermined geofenced area based on the communicated location; and
   taking an action based on the geofencing determination.

* * * * *